(12) United States Patent
Matsunaga

(10) Patent No.: US 7,366,689 B2
(45) Date of Patent: Apr. 29, 2008

(54) METHOD OF NOTIFYING INFORMATION ABOUT COMMODITY

(75) Inventor: Tetsuya Matsunaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 188 days.

(21) Appl. No.: 10/836,234

(22) Filed: May 3, 2004

(65) Prior Publication Data
US 2004/0205005 A1 Oct. 14, 2004

Related U.S. Application Data

(63) Continuation of application No. PCT/JP01/09636, filed on Nov. 2, 2001.

(51) Int. Cl.
*G06Q 30/00* (2006.01)

(52) U.S. Cl. .................. 705/26; 705/1; 705/27

(58) Field of Classification Search .......... 705/26, 705/27, 28
See application file for complete search history.

(56) References Cited

U.S. PATENT DOCUMENTS

| | | | | |
|---|---|---|---|---|
| 6,463,345 | B1 * | 10/2002 | Peachey-Kountz et al. | ... 700/99 |
| 6,470,323 | B1 * | 10/2002 | Suzuki et al. | ........... 705/27 |
| 6,922,676 | B2 * | 7/2005 | Alnwick | ........... 705/28 |
| 2002/0049638 | A1 * | 4/2002 | Ito | ........... 705/26 |
| 2002/0128918 | A1 * | 9/2002 | Chao et al. | ........... 705/26 |

FOREIGN PATENT DOCUMENTS

| | | |
|---|---|---|
| JP | 07-250186 | 9/1995 |
| JP | 10-055399 | 2/1998 |
| JP | 11-213077 | 8/1999 |
| JP | 2000-99585 | 2/2000 |
| JP | 2000-099585 | 4/2000 |
| JP | 2001-109804 | 4/2001 |
| JP | 2001-297231 | 10/2001 |

OTHER PUBLICATIONS

Hirokazu Tsubaki, "Seriously Investigating the Real Power: EC Benchmark 4th Catalog Mail-Order Selling", INTERNET magazine, No. 73, published by Impress Co., Ltd., 2001, pp. 291-299.*
Hirokazu Tsubaki, "Seriously Investigating the Real Power: EC Benchmark 4$^{th}$ Catalog Mail-Order Selling", INTERNET magazine, No. 73, published by Impress Co., Ltd., 2001, pp. 291-299.
Translation of International Examination Report, Jun. 24, 2004.
Notice of Rejection Grounds for Japanese Application No. 2003-540891; dated Apr. 17, 2007.

* cited by examiner

*Primary Examiner*—Jeffrey A. Smith
*Assistant Examiner*—Jason B. Dunham
(74) *Attorney, Agent, or Firm*—Staas & Halsey LLP

(57) ABSTRACT

A server computer builds a shopping site on a network. A user can purchase his or her desired commodity from the shopping site by using a user terminal. If a commodity requested by the user is out of stock, the server computer makes an inquiry to the user about the request level of purchase of the commodity. When the out-of-stock commodity has arrived, the server computer transmits arrival notification mail to users whose request levels are high in descending order of request level. Contents of the arrival notification mail vary by request level.

10 Claims, 17 Drawing Sheets

```
THIS COMMODITY IS TEMPORARILY UNAVAILABLE.
NOTIFY VIA EMAIL WHEN THE COMMODITY BECOMES
AVAILABLE

COMMODITY NAME    PERSONAL COMPUTER  M6/907

TYPE NAME         F69074

E-mail            aaa@bbb. com

RESERVE      REGISTER      CLOSE
```

F I G.  5 A

```
DEPOSIT IS ¥△△△
NOT REFUNDABLE FOR CANCELLATION

○CREDIT         CARD NUMBER INPUT FIELD

○TRANSFER

INPUT CONTACT POINT    03 - XXXX - XXXX

CANCEL      RESERVE
```

F I G.  5 B

```
YOUR RESERVATION NUMBER IS × × ×.
KEEP THE NUMBER
```

F I G.  5 C

| MAIL ADDRESS OF USER | APPLICATION DATE AND TIME | APPLICATION TYPE | ... |
|---|---|---|---|
| aaa@bbb. com | 01/09/03 17:54:13 | RESERVATION | |
| bbb@ccc. com | 01/09/03/20:01:05 | NOTIFICATION ONLY | |
| ccc@ddd. com | 01/09/03/23:15:18 | NOTIFICATION ONLY | |
| ⋮ | ⋮ | ⋮ | |

F I G. 6

| MAIL ADDRESS | aaa@bbb.com |
|---|---|
| DISTRIBUTION TYPE | AUTOMATIC |
| TYPE NAME | F96074 |
| APPLICATION DATE AND TIME | 01/09/03/17:54:13 |
| APPLICATION TYPE | RESERVE |
| APPLICATION LEVEL | 1 |
| MAIL DISTRIBUTION NUMBER | XXXXXXXX |
| SELLING CODE | — |
| RESERVATION NUMBER (ORDER NUMBER) | 12345 |
| PURCHASE FLAG | NOT YET PURCHASED |
| REGISTRATION COMPLETION TRANSMISSION DATE AND TIME | 01/09/03/17:54:53 |
| NOTIFICATION MAIL TRANSMISSION DATE AND TIME | 01/09/09/09:35:11 |
| DELETION FLAG | 0 |

FIG. 7A

| DISTRIBUTION INTERVALS | 48 HOURS |
|---|---|
| COLLECTIVE DISTRIBUTION NUMBER | 10 |
| RESERVATION VALID TERM | ONE WEEK |
| PREFERENTIAL SELLING TERM | ONE WEEK |

FIG. 7B

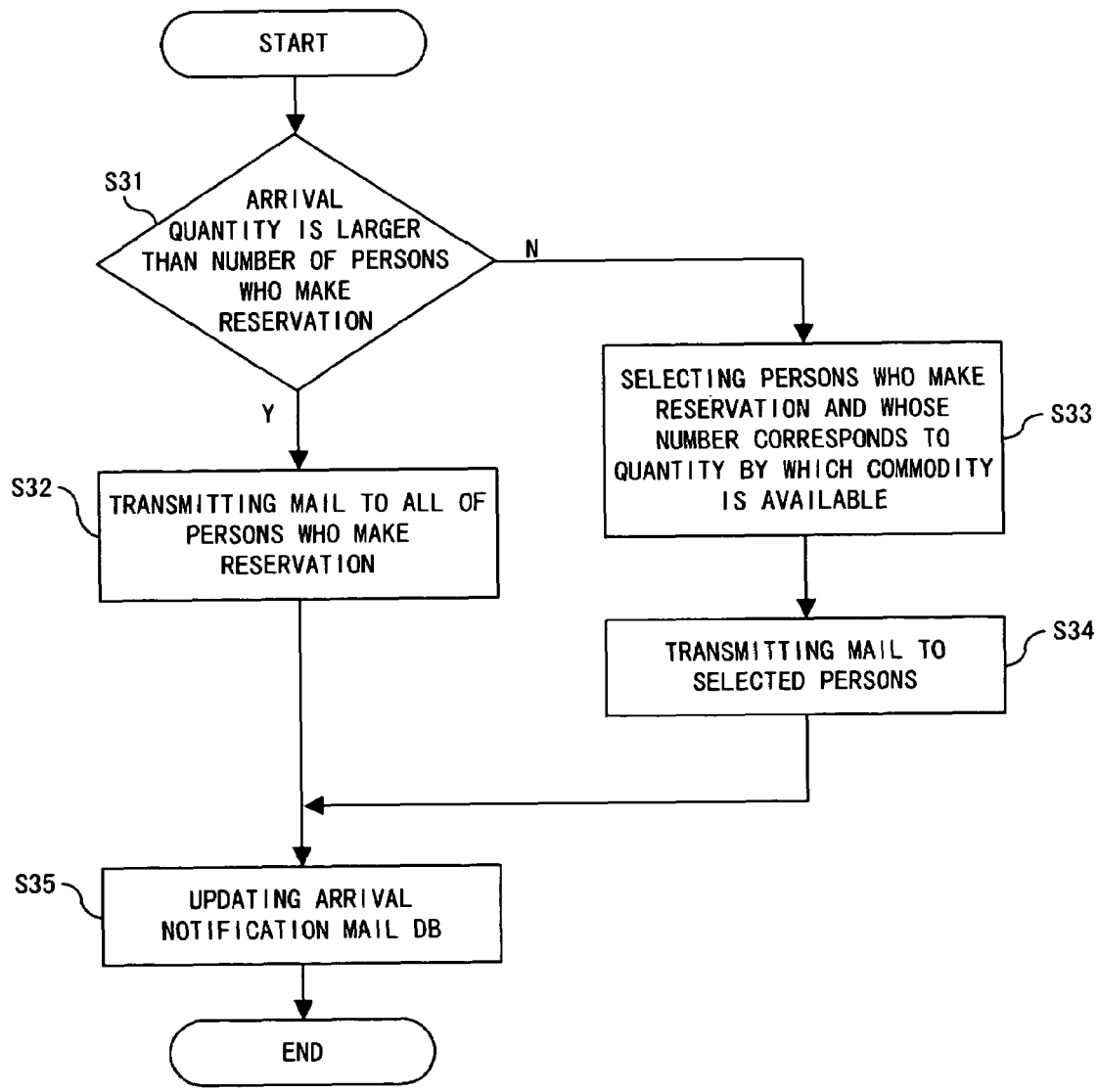
F I G. 1 0

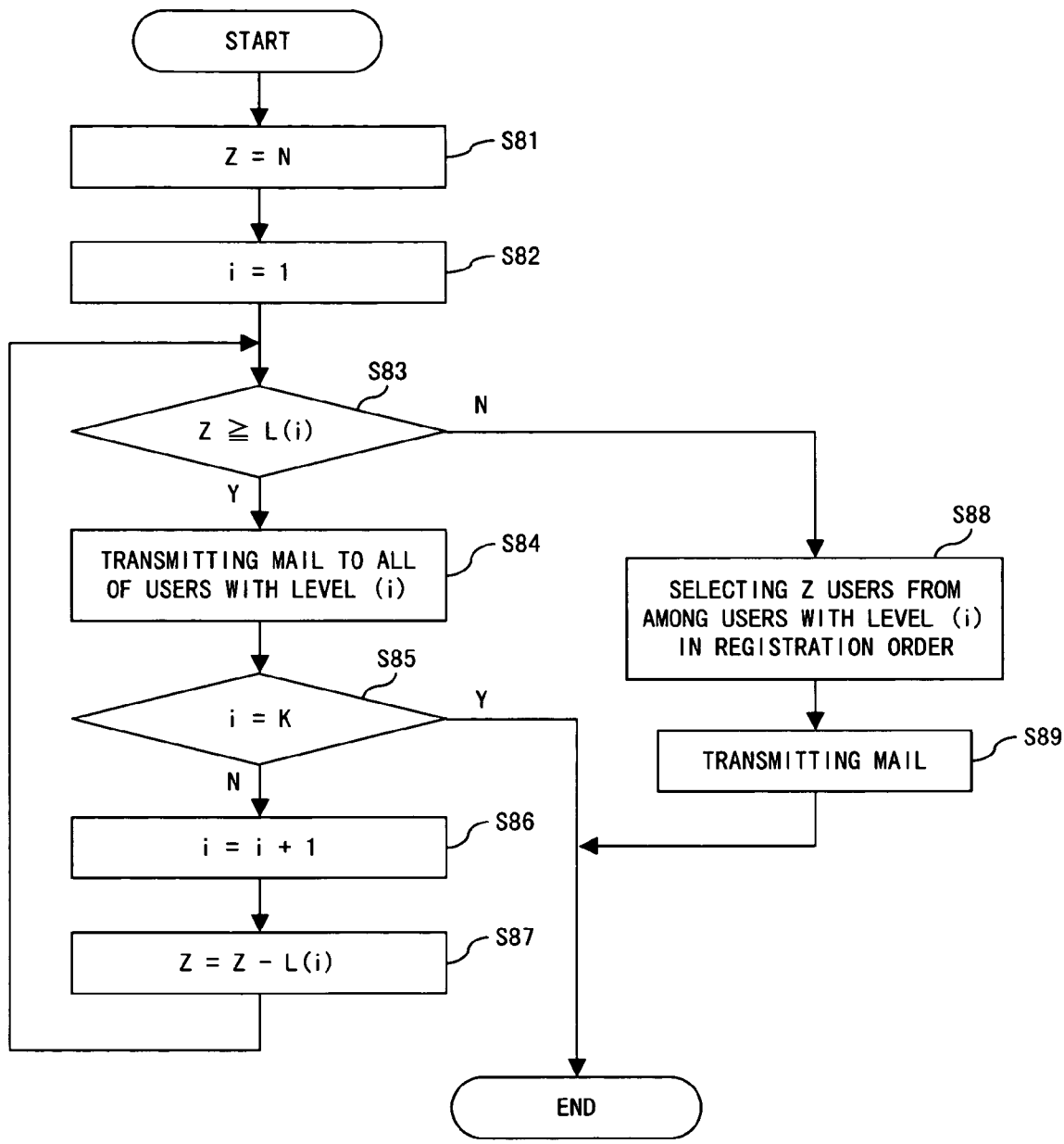
F I G. 1 5

METHOD OF NOTIFYING INFORMATION ABOUT COMMODITY

CROSS REFERENCE TO RELATED APPLICATION

This is a continuation of an International application No. PCT/JP01/09636, which was filed on Nov. 2, 2001.

BACKGROUND OF THE INVENTION

1. Field of the Invention

The present invention relates to a method of notifying a user of information about a commodity in a system selling the commodity by using a communications network. In addition, the present invention is useful in a field, for example, electronic business transactions or e-commerce.

2. Description of the Related Art

In recent years, services selling or offering a commodity by using a shopping site built on a communications network has been increasing rapidly. With such a type of service, if a user (a consumer or a customer) accesses a shopping site by using a terminal device such as a personal computer, etc., a catalog, etc. of commodities offered by the shopping site is displayed on the terminal device of the user in normal cases. Here, the user can reference the displayed catalog and order his or her desired commodity. In the meantime, a commodity seller that operates the shopping site ships the corresponding commodity to a specified destination by order of the user.

Incidentally, there are often cases where a commodity seller cannot offer a commodity handled by its own shopping site. Examples include a case where the commodity is out of stock. At an existing shopping site, such a commodity (sometimes referred to as an "out-of-stock commodity" hereinafter) is deleted from the catalog of the shopping site, or disabled to be placed in a shopping cart.

At this time, if the user attempts to purchase the out-of-stock commodity at the shopping site, he or she must repeatedly visit the shopping site so as to verify if the commodity has arrived, which is troublesome for the user. In consequence, the commodity seller can possibly lose a business opportunity, because the seller is not able to sell an out-of-stock commodity to a user who accesses the site and is in need of the commodity.

As one of solutions to this problem, for example, rendered is a service that notifies, via e-mail, a user who accesses a commodity while it is out of stock that the commodity has become available when it arrives. With this service, however, a user cannot purchase the commodity in some cases despite the receipt of the notification that the commodity has arrived, if a large number of users who received the notification simultaneously visit the shopping site. Assume that 100 users access an out-of-stock commodity. Also assume that a commodity seller obtains only 10 identical commodities. In this case, with the existing service, notification that the out-of-stock commodity has arrived is simultaneously transmitted to the 100 users via e-mail. Accordingly, some of the users can purchase the commodity based on the notification, but the rest of the users cannot purchase the commodity despite the receipt of the notification that the commodity has arrived.

SUMMARY OF THE INVENTION

An object of the present invention is to improve the convenience of users in a system selling a commodity by using a communications network.

A commodity information notifying method according to the present invention is a method of notifying a user of information about a commodity from a server computer accepting a request in a system offering the commodity at the request of the user. With this method, the server computer makes an inquiry to the user about the request level of purchase of the commodity if the commodity requested by the user cannot be offered, receives request level information indicating the request level from the user, and transmits, to a user terminal of the user, commodity offering information about the offering of the commodity based on the request level information received from the user, when the commodity which could not be offered becomes available.

With this method, the server computer notifies each user of commodity offering information in accordance with the request level of each user. Here, a user whose request level of purchase of a commodity is high has a high possibility of purchasing the commodity. Accordingly, a commodity for which the stock quantity is insufficient can be efficiently sold if commodity offering information is notified at different timing, or commodity offering information having different contents are notified in accordance with the request level of a user.

In this method, the server computer may transmit corresponding commodity offering information to users whose request levels are high in descending order of request level when the request level information is received from a plurality of users. With this procedure, notification that the commodity can be offered is preferentially made to a user whose request level is high, whereby the user whose request level is high can preferentially purchase the commodity.

Additionally, in this method, the server computer may transmit commodity offering information to a predetermined number of users at predetermined time intervals. Introducing this procedure prevents many users who receive the commodity offering information from simultaneously ordering the commodity. Accordingly, a situation where a user cannot purchase the commodity despite the receipt of notification that the commodity becomes available can be avoided.

With a commodity information notifying method according to another aspect of the present invention, a server computer makes an inquiry to a user about the request level of purchase of a commodity and about the address of a user terminal of the user if the commodity requested by the user cannot be offered, receives request level information indicating the request level and the address from the user, stores the received request level information and the address in a database by making a correspondence between the information and the address, selects an address, to which commodity offering information about offering of the commodity is to be preferentially transmitted, from the database based on the request level information when the commodity that could not be offered becomes available, and transmits the commodity offering information to the selected address. The "address of a user terminal" corresponds to a mail address in the embodiment. Namely, this address is not assigned fixedly to a terminal, but set in an arbitrary terminal device.

BRIEF DESCRIPTION OF THE DRAWINGS

FIG. 5A exemplifies a screen for making an inquiry about a user address to a user;

FIG. 5B exemplifies a screen for applying for a reservation;

FIG. 5C exemplifies a screen for notifying a reservation number;

FIG. 6 exemplifies an arrival notification mail DB;

FIG. 7A shows an implementation example of items managed by the arrival notification mail DB;

FIG. 7B shows an implementation example of items managed by a mail condition DB;

FIG. 10 is a flowchart showing a process in which the server computer transmits the arrival notification mail to a person who makes a reservation;

FIG. 15 is a general-purpose flowchart showing a process in which the server computer transmits the arrival notification mail.

DESCRIPTION OF THE PREFERRED EMBODIMENTS

Hereinafter, embodiments according to the present invention are described. The present invention relates to a method notifying a user that a commodity which was not available temporarily, has become available in a commodity selling system which sells the commodity by using a communications network. Here, as a factor that a commodity is not available temporarily, "out of stock" is mainly assumed. Accordingly, a commodity that is not available temporarily is hereinafter referred to as an "out-of-stock commodity" in some cases, although the factor that a commodity is not available temporarily is not limited to the "out-of-stock".

Figure 1:
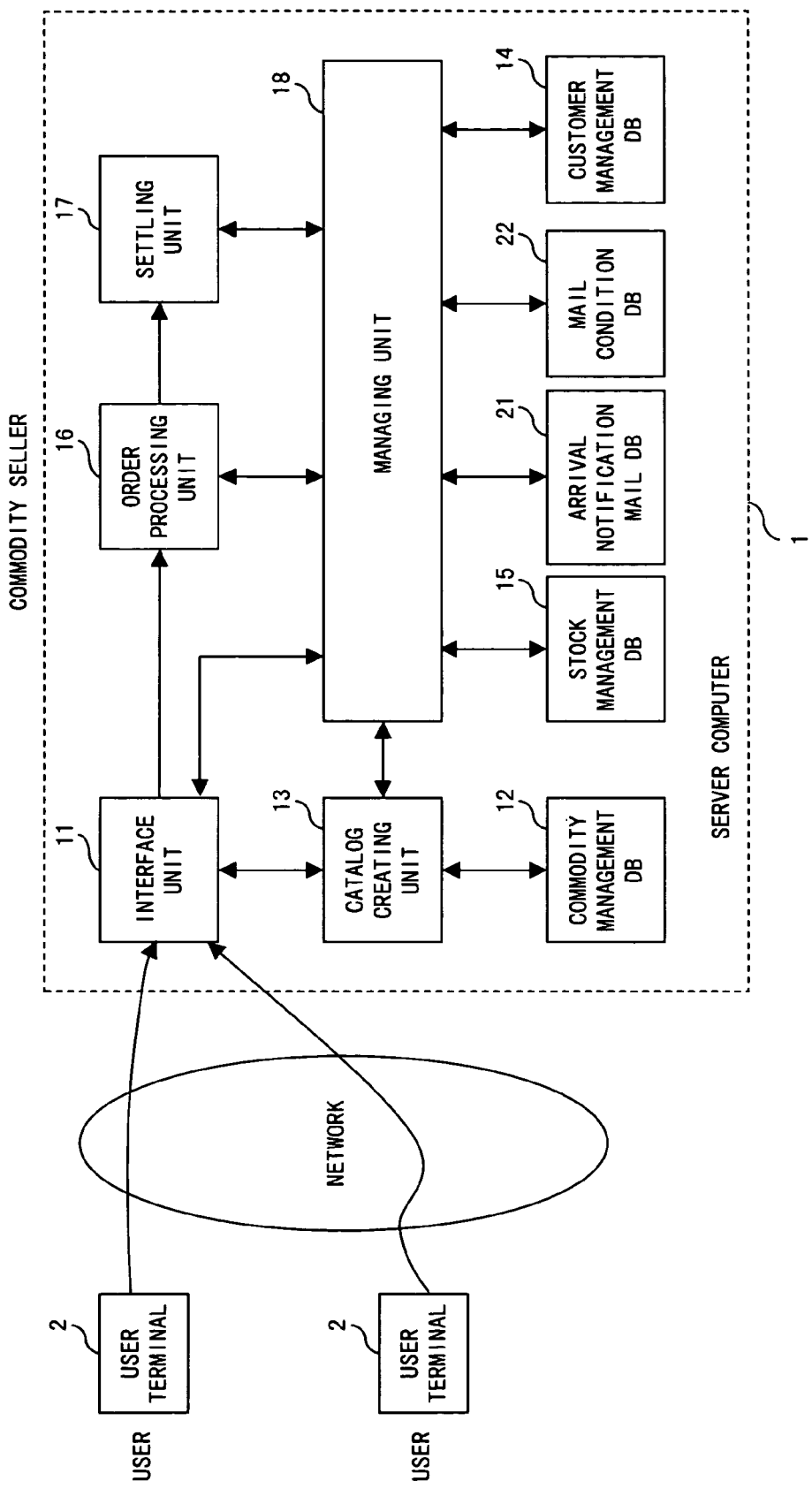
FIG. 1 is a schematic diagram showing the configuration of an embodiment of a commodity selling system to which the present invention is applied.

FIG. 1 shows the configuration of an embodiment of a commodity selling system to which the present invention is applied. The commodity selling system according to the embodiment is implemented by a server computer 1 that provides a shopping site on a network. This shopping site is assumed to be implemented, for example, by a Web page (page information offered by a World Wide Web server) made public on the Internet, and to be operated by a commodity seller that sells various types of commodities.

If a user purchases a commodity by using the shopping site of the commodity seller, he or she accesses the server computer 1 by using a user terminal 2. Then, the user can order a desired commodity in accordance with information displayed on the user terminal 2. The user terminal 2 is, for example, a personal computer, a PDA, a cellular phone, etc. although it is not particularly limited as far as it has a function for transmitting/receiving information to/from the server computer 1 via a network. Here, the user terminal 2 is assumed to have a function for browsing a Web page. Additionally, a correspondence between a user terminal and a user is not fixed. A terminal having a browsing function used by a user can be the user terminal 2.

An interface unit 11 includes software corresponding to a predetermined communications protocol (TCP/IP, HTTP, etc.), and terminates a line that makes a connection to a network.

A commodity management DB 12 is a database for storing information about a commodity offered by the commodity seller. Specifically, for example, specifications, a selling price, an appearance image, etc. of the commodity are stored. A catalog creating unit 13 extracts corresponding information from the commodity management DB 12 at the request of the user, and creates a commodity catalog of the commodity from the extracted information. The catalog creating unit 13 then transmits the created catalog to the user.

A customer management DB 14 is a database for managing a user (customer) registered as a member of the shopping site. The member can receive, for example, a preset bonus or privilege. A stock management DB 15 is a database for managing the stock status of the commodity handled by the shopping site.

An order processing unit 16 accepts an order from a user. A settling unit 17 makes a settlement corresponding to the order from the user. The order processing unit 16 and the settling unit 17 are implemented fundamentally with existing techniques.

A managing unit 18 manages the above described databases 12, 14, and 15, and also manages the operations of the catalog creating unit 13, the order processing unit 16, and the settling unit 17. For example, if the catalog of the commodity is requested from a user, the managing unit 18 checks the stock status of the commodity by referencing the stock management DB 15, and passes its result to the catalog creating unit 13. As a result, the catalog creating unit 13 can edit the commodity catalog according to the stock status. Or, if the order processing unit 16 receives an order for a commodity from a user, the managing unit 18 updates the stock management DB 15 according to the order.

An arrival notification mail DB 21 is a database for registering a user who desires to receive arrival notification mail. Here, the arrival notification mail is electronic mail for notifying that an out-of-stock commodity has arrived, namely, electronic mail for notifying that a commodity which was not available temporarily becomes available. A mail condition DB 22 is a database for storing information about the transmission of arrival notification mail. Also these databases 21 and 22 are managed by the managing unit 18.

A process sequence of the commodity selling system according to the embodiment is described next. In this system, the commodity seller is assumed to make a URL for identifying the shopping site public. Here, this URL is made public to an indefinite number of users so as to make an access. Hereinafter, this URL is referred to as a "general URL".

When a user visits the shopping site, he or she accesses the server computer 1 by using the general URL. As a result, information for purchasing a commodity by using the shopping site is displayed on the user terminal 2. When the user selects his or her desired commodity, information (commodity catalog, etc.) about the commodity is displayed on the user terminal 2.

Figure 2A:
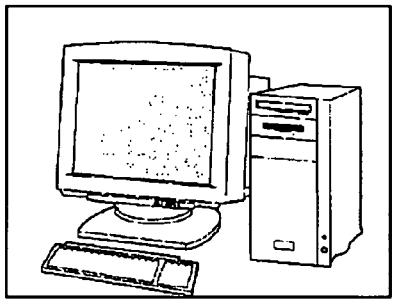
FIGS. 2A and 2B exemplify commodity information displayed on a user terminal.

FIG. 2A exemplifies commodity information (commodity catalog) displayed on the user terminal 2. Here, the appearance image, the specifications, the selling price, the delivery term, etc. of the commodity are displayed as the commodity information of the commodity specified by the user. Along with the above described information items, a field for inputting a purchase quantity, and a button for making an instruction to purchase the commodity (purchase instruction button: for placing the commodity in a cart) are displayed. The commodity information is created by the catalog creating unit 13.

When the user purchases the commodity displayed on the user terminal 2, he or she inputs its purchase quantity, and clicks the purchase instruction button. As a result, the request (order) of the user is passed to the server computer 1.

When the server computer 1 accepts the order from the user, corresponding processes are executed by the order processing unit 16 and the settling unit 17. These processes include, for example, a process for making an inquiry to a user about a shipping address and a payment method, a process for authenticating the credit card of the user, a process for updating the stock management DB 15, etc.

Figure 2B:
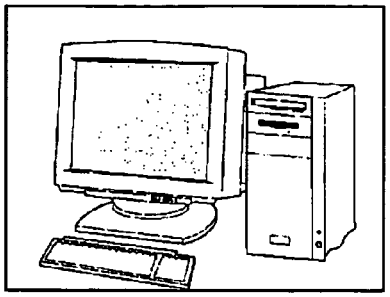

If the commodity accessed by the user is out of stock, information indicating that the commodity cannot be purchased is displayed on the user terminal 2 as shown in FIG. 2B. Namely, in the embodiment shown in FIG. 2B, "pending" is displayed as the "delivery term", the field for inputting a purchase quantity is not displayed, and a button for making an instruction to request arrival notification mail (notification request button: arrival notification mail) is displayed instead of the purchase instruction button. Also this commodity information is created by the catalog creating unit 13.

If the user desires the arrival notification mail for the commodity displayed on the user terminal 2, he or she clicks the notification request button. As a result, the request of the user is passed to the server computer 1. Upon receipt of this request, the server computer 1 makes an inquiry to the user about the mail address of the user.

Figure 3A:
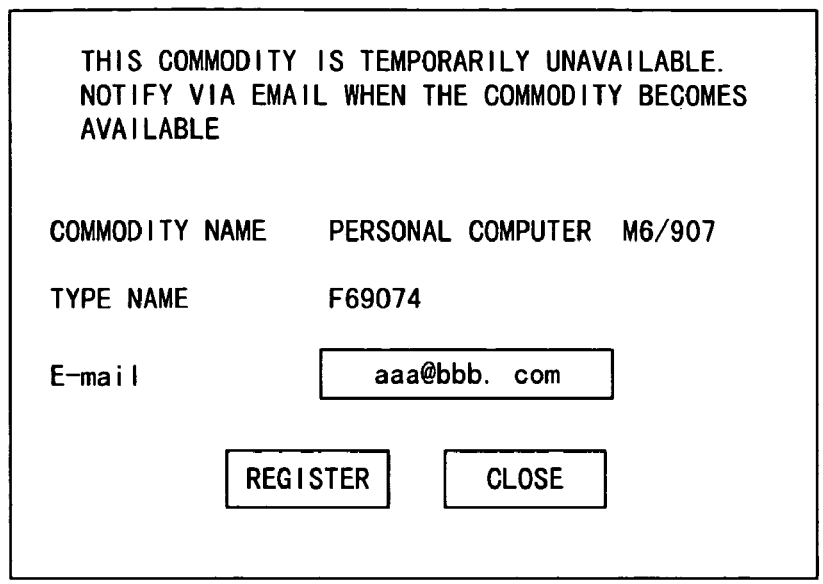
FIG. 3A exemplifies a screen for making an inquiry about a mail address to a user.

FIG. 3A exemplifies a screen for making an inquiry about a mail address to a user. This screen is displayed on the user terminal 2. If the user applies for the arrival notification mail, he or she inputs his or her mail address, and clicks the register button. As a result, information input by the user is passed to the server computer 1. The server computer 1 registers the user to the arrival notification mail DB 21 upon receipt of the information input by using the screen shown in FIG. 3A.

Figure 4:
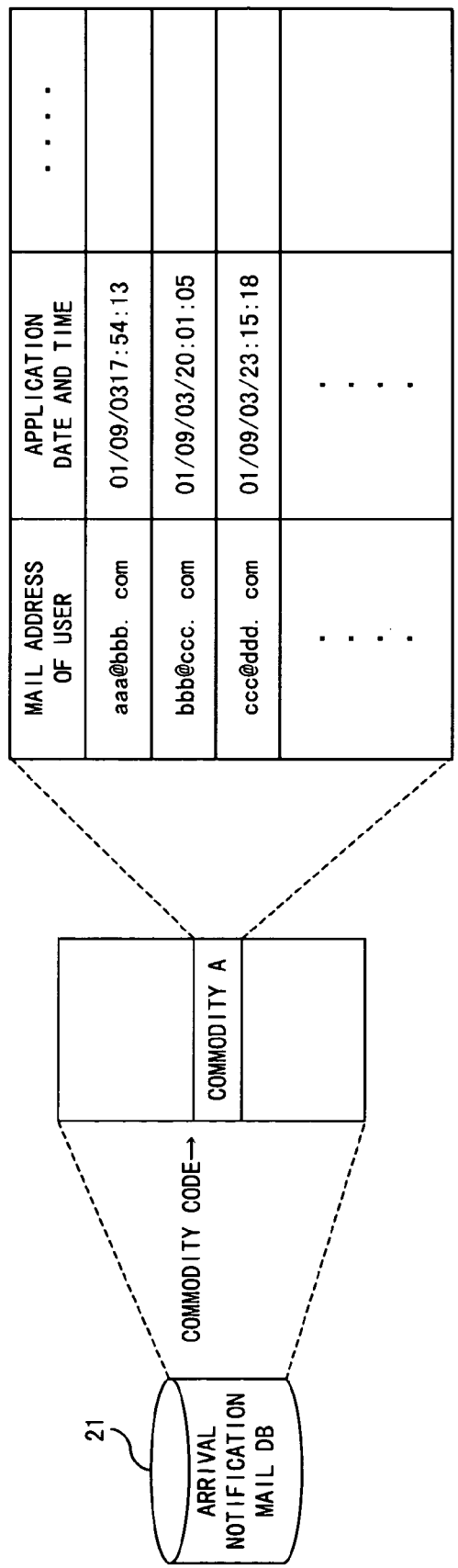
FIG. 4 schematically shows the configuration of an arrival notification mail DB.

FIG. 4 schematically shows the configuration of the arrival notification mail DB 21. In the arrival notification mail DB 21, a registration region is secured for each out-of-stock commodity, and the mail address of a user who desires the arrival notification mail is registered for corresponding out-of-stock commodity. Here, the mail address of the user, which is input by using the screen shown in FIG. 3A, is registered. At this time, also a date and time when the mail address is registered is recorded.

Figure 3B:
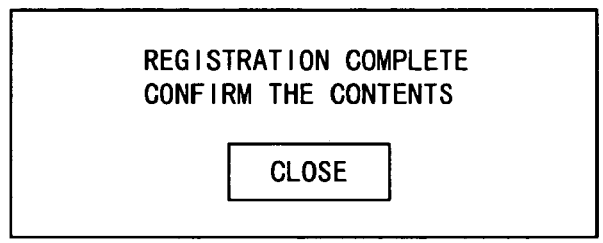
FIG. 3B exemplifies a completion message.

After the server computer 1 registers the mail address of the user who desires the arrival notification mail to the arrival notification mail DB 21, it transmits a completion message to the user terminal 2. The completion message displayed on the user terminal 2 is exemplified in FIG. 3B.

Figure 3C:
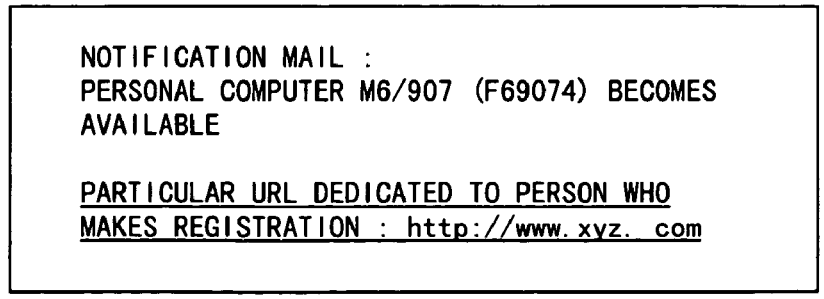
FIG. 3C exemplifies arrival notification mail.

Thereafter, when the out-of-stock commodity has arrived, the server computer 1 creates the arrival notification mail, and transmits the arrival notification mail to the mail address registered to the arrival notification mail DB 21. In the arrival notification mail, a particular URL dedicated to a person who makes a registration is displayed as shown in FIG. 3C. Here, the particular URL dedicated to a person who makes a registration is not made public to general users. The server computer 1 accepts an order from a user who makes an access by using the particular URL dedicated to a person who makes a registration with higher priority than that from a user who makes an access by using the general URL.

Note that the server computer 1 does not transmit the arrival notification mail to all of the mail addresses registered to the arrival notification mail DB 21, but transmits a predetermined number of arrival notification mails at predetermined time intervals in a predetermined order. Or, the server computer 1 may transmit the arrival notification mail only to users (persons who make a registration) whose number corresponds to an arrival quantity. In these cases, the transmission of the arrival notification mail is made fundamentally in order where the persons are registered to the arrival notification mail DB 21. Accordingly, accesses made by users who receive the arrival notification mail can be prevented from concentrating in one period. Or, the number of orders from the users who receive the arrival notification mail does not exceed the arrival quantity, so that a situation where "the commodity cannot be purchased despite the receipt of the arrival notification mail" can be avoided.

The commodity selling system according to the embodiment can also accept a purchase reservation for a commodity from a user if the commodity accessed by the user is out of stock. In this case, the server computer 1 displays a screen shown in FIG. 5A instead of the screen shown in FIG. 3A on the user terminal 2 when the notification request button is clicked on the screen shown in FIG. 2B.

If the user makes a reservation for the purchase of an out-of-stock commodity, he or she clicks a reserve button on the screen shown in FIG. 5A. As a result, the request (purchase reservation) of the user is passed to the server computer 1. Upon receipt of the request, the server computer 1 displays the screen shown in FIG. 5B on the user terminal 2. This screen is intended to make an inquiry to the user about the payment method of a deposit.

When the user inputs the payment method (including a card number if the payment method is a credit card payment) of the deposit, and the contact point (telephone number, etc.) of the user by using the screen shown in FIG. 5B, and clicks the "reserve" button, the server computer 1 receives these information items. Then, the server computer 1 registers these information items to the arrival notification mail DB 21. The arrival notification mail DB 21 in this case is exemplified in FIG. 6. In the arrival notification mail DB 21, a field for registering an "application type" is provided. The "application type" field indicates whether a user requests either a purchase reservation or arrival notification mail only. Namely, the "application type" indicates the request level of a user for the purchase of a commodity. In this example, the server computer 1 determines that the request level of the user who desires the "purchase reservation" is higher than that of a user who desires the "arrival notification mail only".

The server computer 1 assigns a reservation number to a reservation when registering a user who applies for the purchase reservation to the arrival notification mail DB 21. The reservation number is then displayed on the user terminal 2 as shown in FIG. 5C.

Thereafter, when the out-of-stock commodity has arrived, the server computer 1 creates the arrival notification mail, and transmits the created arrival notification mail to mail addresses registered to the arrival notification mail DB 21.

The arrival notification mail may be identical even if it is transmitted to a user (person making a reservation) who applied for the purchase reservation, or to a user (person making a registration) who requests the notification only. However, the arrival notification mail, which is transmitted to the person who makes a registration, displays a particular URL dedicated to a person who makes a registration, whereas the arrival notification mail, which is transmitted to a person who makes a reservation, displays a particular URL dedicated to a person who makes a reservation. Although the particular URL dedicated to a person who makes a registration and that dedicated to a person who makes a reservation are different in this embodiment, they may be the same. However, it should be remembered that the particular URL dedicated to a person who makes a registration and the particular URL dedicated to a person who makes a reservation must be different from the general URL.

Upon arrival of the commodity, the server computer 1 first transmits the arrival notification mail to persons who make a reservation, and preferentially accepts an order from them. After all of persons who make a reservation ordered the commodity, or after a predetermined reservation valid term expires, the server computer 1 transmits the arrival notification mail to persons who make a registration. In this case, the server computer 1 does not simultaneously transmit the arrival notification mail to all of the persons who make the registration, but transmits a predetermined number of arrival notification mails at predetermined time intervals.

As described above, the commodity selling system according to the embodiment transmits the arrival notification mail to users (persons who make a reservation) whose request levels are high, and then to users (persons who make a registration) whose request levels are low, when an out-of-stock commodity becomes available. Accordingly, the users whose request levels are high can surely purchase the commodity earlier than the other users.

Additionally, when the out-of-stock commodity has arrived, the arrival notification mail is transmitted to persons who make a reservation or a registration, and the particular URLs are notified as described above. At this time, the server computer 1 accepts an order from a user who makes an access by using the particular URL, but denies an order from a user who makes an access by using the general URL. Namely, in a term during which an order from a person who makes a reservation or registration is accepted, a message indicating "out-of-stock" is displayed on the user terminal 2 of a user who makes an access by using the general URL even if the commodity is in stock.

FIG. 7A shows an implementation example of the arrival notification mail DB 21. A "mail address" is the mail address of a user who makes a reservation for the purchase of an out-of-stock commodity, or of a user who requests the arrival notification mail. A "distribution type" is information for identifying either automatic distribution or manual distribution. Normally, "automatic" is set. "manual" is set, for example, if unusual notification must be made to a user. As the unusual notification, a case where the production of a corresponding commodity is stopped and an alternative to the commodity is introduced, or the like is assumed.

A "type name" is the type name or the name of a commodity. An "application date and time" is a date and time when a user applies for the arrival notification (including a purchase reservation). An "application type" identifies whether the request of a user is either the "purchase reservation" or the "arrival notification mail only". An "application level" indicates the request level of a user for the purchase of a commodity. In this embodiment, there are only the two request levels such as "1: purchase reservation", and "2: arrival notification only". However, three request levels or more may be set.

A "mail distribution number" is a serial number for managing each record within the server computer 1. A "selling code" indicates whether or not a user belongs to a particular group. The commodity selling system according to the embodiment can offer some bonus or privilege (such as a discount) to a user who belongs to a particular group.

A "reservation number (order number)" is an identification number uniquely assigned to each purchase reservation. A "purchase flag" indicates whether or not a user who receives the arrival notification mail actually purchases a corresponding commodity. A "registration completion transmission date and time" indicates a date and time when completion mail notifying the completion of registration to the arrival notification mail DB 21 is transmitted. A "notification mail transmission date and time" indicates a date and time when the arrival notification mail is transmitted. A "deletion flag" indicates whether or not to delete a corresponding record.

FIG. 7B shows an implementation example of the mail condition DB 22. A "distribution interval" specifies a transmission interval in a case where the arrival notification mail is transmitted to a predetermined number of users. A "collective distribution number" specifies the number of users to whom the arrival notification mail is to be transmitted. A "reservation valid term" is a term during which an order from a person who makes a reservation is accepted. This term is measured from a time point when the arrival notification mail is transmitted to a person who makes a reservation. A "preferential selling term" is a term during which an order from a person who makes a registration is accepted. This term is measured from a time point when the arrival notification mail is transmitted to a person who makes a registration.

Operations of the server computer 1 are described next with reference to flowcharts. Specifically, in the commodity selling system according to the embodiment, a sequence executed when an access is made from a user, a sequence executed when the arrival notification mail is transmitted to a person who makes a reservation or a registration, and a sequence executed when an access from a person who makes a reservation or a registration is accepted are described.

Figure 8:
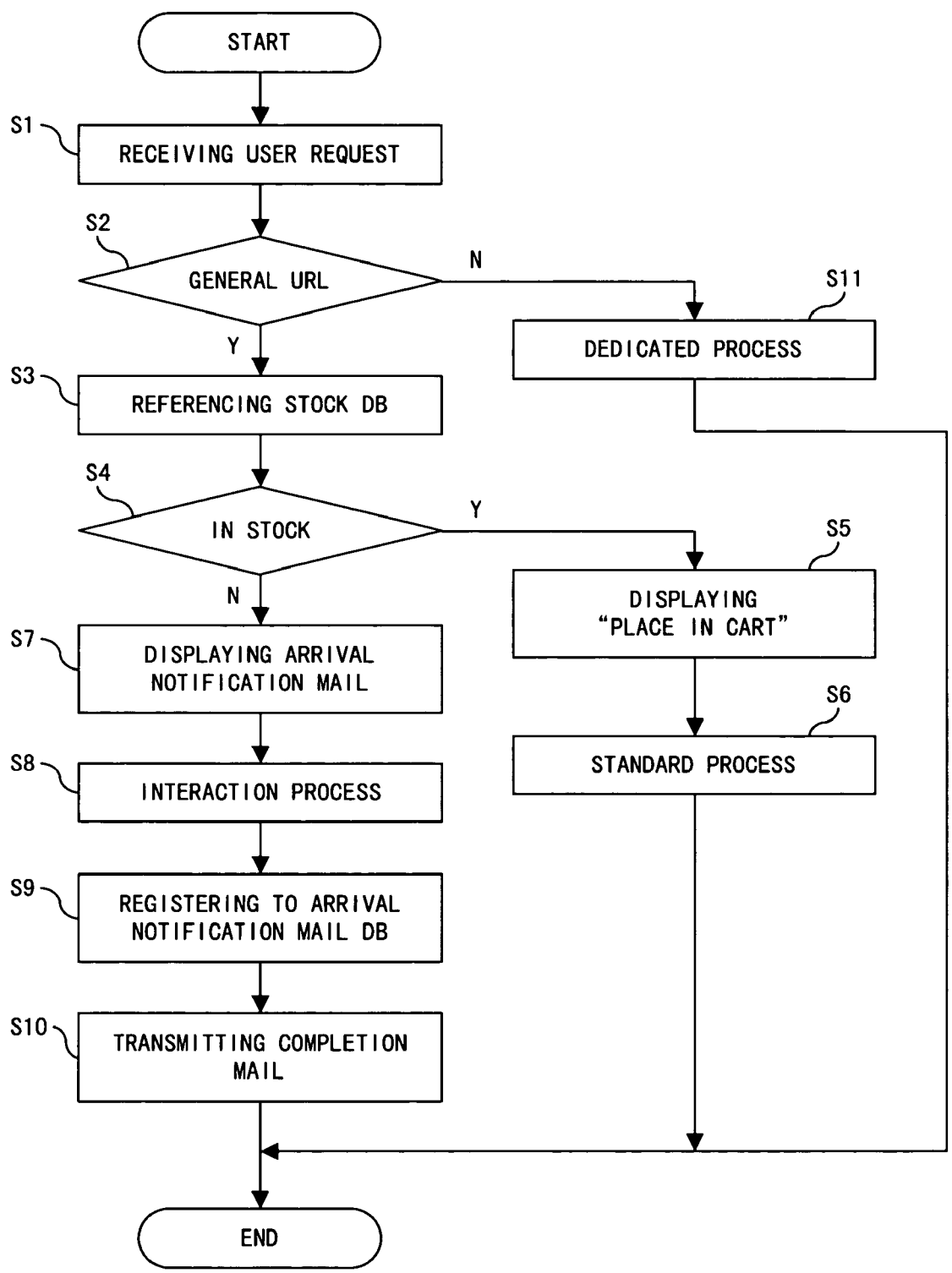
FIG. 8 is a flowchart showing a process executed when a server computer accepts an access made from a user.

FIG. 8 shows the process executed when the server computer 1 accepts an access from a user. Here, assume that the user visits the shopping site by using the user terminal 2. This process is executed when the user requests the commodity information of a commodity.

In step S1, the request from the user is received. This request is generated in such a way that the user specifies a desired commodity by using the user terminal 2. The generated request is transmitted to the server computer 1 via a network.

In step S2, it is examined whether or not the display request the request to display the commodity information is an access made by using the general URL. If the access is made by using the general URL, processes in and after steps S3 are executed. Otherwise, a corresponding dedicated process is executed in step S11. The dedicated process in step S11 is executed when an access is made by using the particular URL, although its details will be described later.

In steps S3 and S4, the stock management DB 15 is referenced to examine whether or not the commodity specified by the user is in stock. At this time, the stock quantity is, for example, a value obtained by subtracting a quantity determined to be sold for someone from an actually secured quantity (including a quantity scheduled to arrive surely). Here, a quantity reserved by users who are registered to the arrival notification mail DB 21 is assumed to be included in the quantity determined to be sold for someone.

If the commodity is in stock, the commodity catalog of the commodity requested by the user is created. At this time, the purchase instruction (instruction to place a commodity in a cart) button is provided in the commodity catalog as shown in FIG. 2A. The commodity catalog including the purchase instruction button is then transmitted to the user terminal 2. As a result, the commodity catalog of the commodity specified by the user and its purchase instruction button are displayed on the user terminal 2. In step S6, a standard process for selling a commodity is executed. The standard process is a process for accepting an order of a commodity via interaction with a user, and may be implemented by an existing technique.

In step S7, the commodity catalog of the commodity requested by the user is created in a similar manner as in step S5. However, in the commodity catalog created in step S7, a notification request (arrival notification mail) button is provided as shown in FIG. 2B. Accordingly, the commodity catalog of the commodity specified by the user and its notification request button are displayed on the user terminal 2.

In step S8, an interaction process with the user is executed. Specifically, for example, a process for making an inquiry to the user about whether or not the user desires arrival notification, a process for making an inquiry to the user about a mail address, a process for receiving replies to the inquiries from the user, and the like are executed. If the user desires the arrival notification, he or she inputs the mail address by using the screen shown in FIG. 3A or FIG. 5A, and selects "reserve" or "register".

In step S9, the information received from the user in step S8 is registered to the arrival notification mail DB 21. Specifically, the "mail address" and the "application type" are registered in accordance with the information received from the user, and the "application date and time" is recorded. Upon completion of the registration operations, the completion mail is transmitted to the user in step S10. At this time, the "registration completion transmission date and time" in the arrival notification mail DB 21 is recorded.

As described above, if a commodity accessed by using the general URL is out of stock, the server computer 1 makes an inquiry to a user about whether or not the user desires the transmission of the arrival notification mail. If the user desires the arrival notification mail, the server computer 1 registers the user to the arrival notification mail DB 21.

Figure 9:
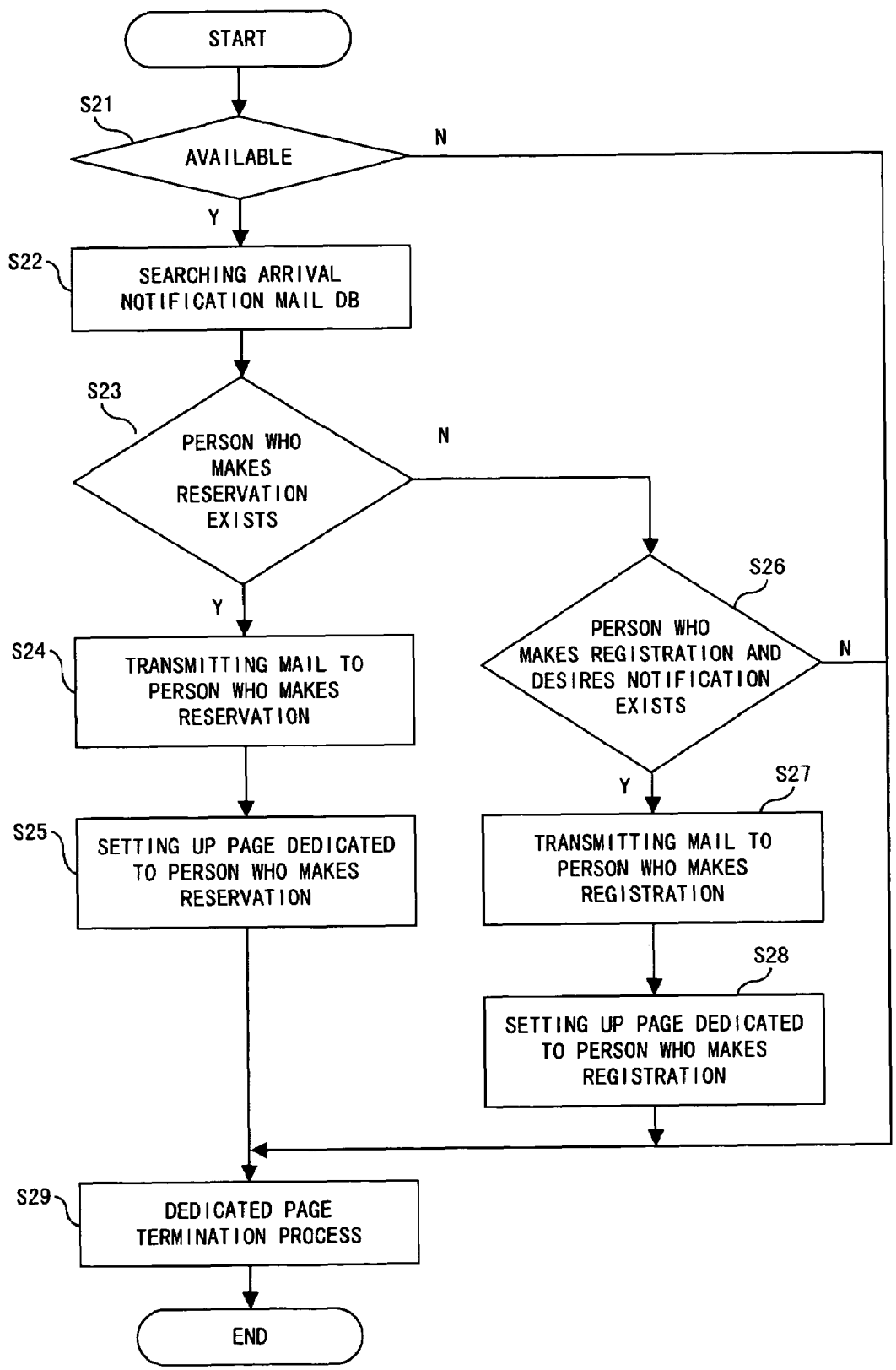
FIG. 9 is a flowchart showing a process in which the server computer transmits arrival notification mail.

FIG. 9 is a flowchart showing the process in which the server computer 1 transmits the arrival notification mail. This process is periodically executed, for example, with a timer interrupt. Additionally, this process is executed for each commodity registered to the arrival notification mail DB 21, namely, each out-of-stock commodity.

In step S21, it is examined whether or not a commodity is available. Namely, it is examined whether or not the out-of-stock commodity has arrived. Specifically, this process is implemented in such a way that the stock management DB 15 is referenced to detect the stock quantity of the corresponding commodity. If the commodity is available, steps S22 to S28 are executed. If the commodity is not available, these steps are skipped.

In steps S22 and S23, it is examined whether or not a person who makes a reservation and does not receive the arrival notification mail exists. This process is implemented in such a way that "reservation" is set as the "application type", and a record in which the "notification mail transmission date and time" is not recorded is searched in the arrival notification mail DB 21. If a person who makes a reservation and does not receive the arrival notification mail exists, the arrival notification mail is transmitted to the person in step S24. Note that the particular URL dedicated to a person who makes a reservation is notified by the arrival notification mail to each person who makes a reservation. Furthermore, the "notification mail transmission date and time" of the corresponding record is recorded in the arrival notification mail DB 21 at this time.

In step S25, a page dedicated to a person who makes a reservation is set up. Here, the page dedicated to a person who makes a reservation is identified by the particular URL dedicated to a person who makes a reservation. Namely, this page is a site at which only an order from a person who makes a reservation is accepted. If the page dedicated to a person who makes a reservation is already set up, this process is skipped.

If persons who make a reservation and do not receive the arrival notification mail do not exist (if the arrival notification mail has already been transmitted to all of persons who make a reservation, or if no persons who make a reservation exist), it is examined whether or not a person who makes a registration and does not receive the arrival notification mail exists. Here, the person who makes a registration means a user who desires the arrival notification only without making a reservation for the purchase of a commodity. This process is implemented in such a way that the "notification only" is set as the "application type", and a record in which the "notification mail transmission date and time" is not recorded is searched in the arrival notification mail DB 21. If a person who makes a registration and does not receive the arrival notification mail exists, the arrival notification mail is transmitted to each person who makes a registration in step S27. The particular URL dedicated to a person who makes a registration is notified by the arrival notification mail to each person who makes a registration. Additionally, the "notification mail transmission date and time" of the corresponding record is respectively recorded in the arrival notification mail DB 21 at this time.

In step S28, a page dedicated to a person who makes a registration is set up. Here, the page dedicated to a person who makes a registration is a site identified by the particular URL dedicated to a person who makes a registration. Namely, this page is a site at which only an order from a person who makes a registration is accepted. If the page dedicated to a person who makes a registration is already set up, this process is skipped.

In step S29, the page dedicated to a person who makes a reservation is terminated when the reservation valid time expires, and the page dedicated to a person who makes a registration is terminated when the preferential selling term expires. This process will be described in detail later.

As described above, when an out-of-stock commodity becomes available, the server computer 1 transmits the arrival notification mail to each of persons who make a reservation if the persons who make a reservation exist. After transmitting the arrival notification mail to all of the persons who make a reservation, the server computer 1 transmits the arrival notification mail to a person who makes a registration. Namely, the arrival notification mail is preferentially transmitted to a person whose request level is high.

FIG. 10 is a flowchart showing the process in which the server computer 1 transmits the arrival notification mail to a person who makes a reservation. This process corresponds to step S24 of FIG. 9. Here, assume that each person who makes a reservation reserves one commodity.

In step S31, a comparison is made between the arrival quantity of the commodity and the number of persons who make a reservation and do not receive the arrival notification mail. Here, the arrival quantity of the commodity is detected by referencing the stock management DB 15. In the meantime, the number of persons who make a reservation and do not receive the arrival notification mail is detected in such a way that the "reservation" is set as the "application type", and a record in which the "notification mail transmission date and time" is not recorded is searched in the arrival notification mail DB 21.

If the arrival quantity of the commodity is larger than the number of persons who make a reservation and do not receive the arrival notification mail, the arrival notification mail is transmitted to all of the persons in step S32. Or, if the arrival quantity of the commodity is smaller than the number of persons who make a reservation and do not receive the arrival notification mail, the number, which corresponds to the arrival quantity of the commodity, of persons who make a reservation are selected in step S33. At this time, the selection of the persons follows the order in which the purchase reservation is made (namely, the registration order). Then, in step S34, the arrival notification mail is respectively transmitted to the selected persons.

In step S35, the arrival notification mail DB 21 is updated. Specifically, the "notification mail transmission date and time" of the record corresponding to a user who receives the arrival notification mail as a result of the process in step S32 or S34 is recorded.

As described above, if the arrival quantity of the commodity is smaller than the number of orders from persons who make a reservation, the server computer 1 selects, from among all of persons who make a reservation, a predetermined number of persons who make a reservation in order where the purchase reservation is made, and transmits the arrival notification mail only to the selected persons.

Figure 11:
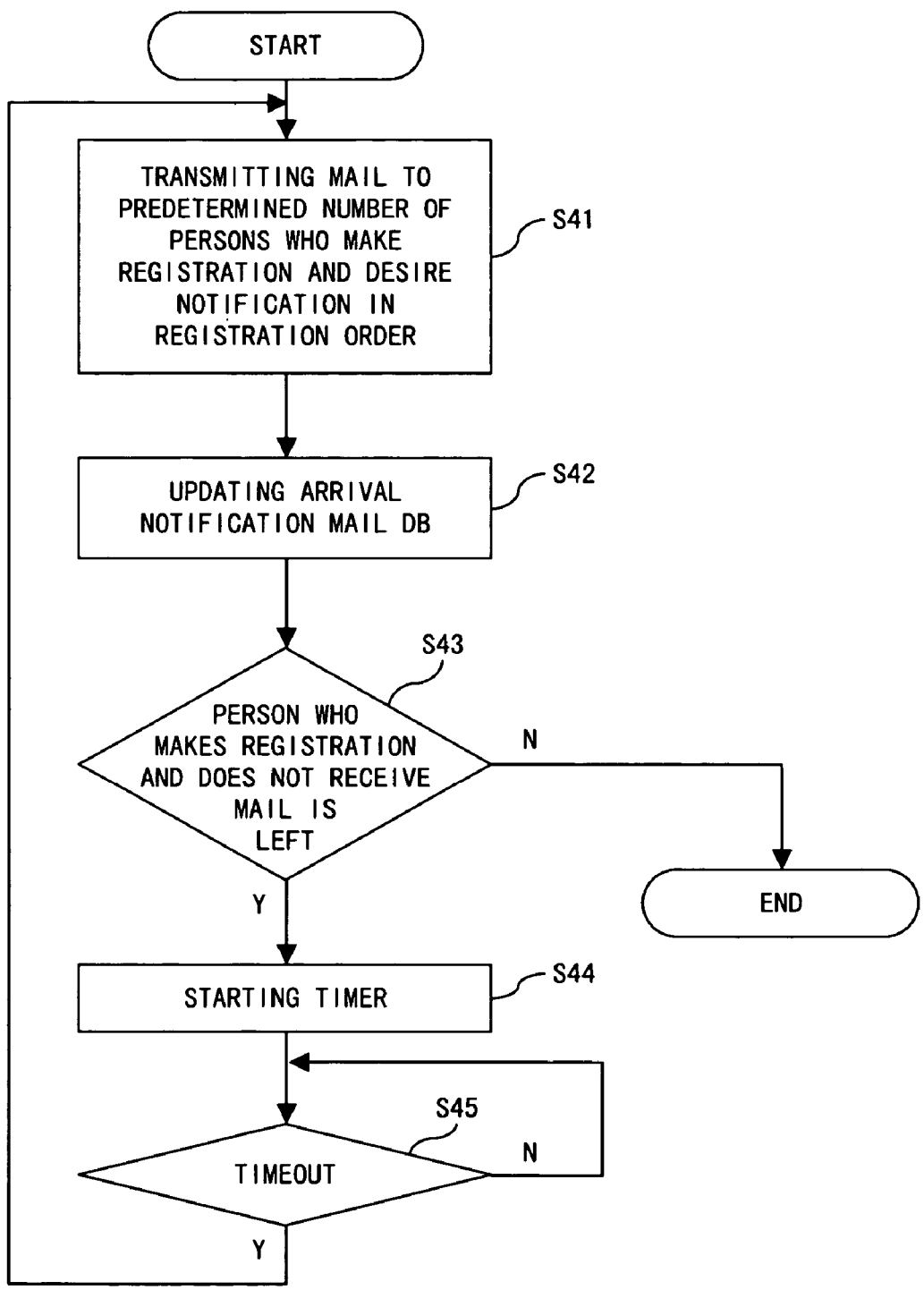
FIG. 11 is a flowchart showing a process in which the server computer transmits the arrival notification mail to a person who makes a registration.

FIG. 11 is a flowchart showing the process in which the server computer 1 transmits the arrival notification mail to a person who makes a registration. This process corresponds to step S27 of FIG. 9.

In step S41, a predetermined number of persons who make a registration are selected from among persons who make a registration and are registered to the arrival notification mail DB 21, then the arrival notification mail is respectively transmitted to the selected persons. Here, the number of persons who make a registration and are to be selected follows the "collective distribution number" set in the mail condition DB 22. Then, in step S42, the arrival notification mail DB 21 is updated. Namely, the "notification mail transmission date and time" in a record corresponding to a user who receives the arrival notification mail as a result of the process in step S41 is recorded.

In step S43, it is examined whether or not a person who makes a registration and does not receive the arrival notification mail is left. This process is implemented in such a way that the "notification only" is set as the "application type", and a record in which the "notification mail transmission date and time" is not recorded is searched in the arrival notification mail DB 21. If all of the persons who make a registration have received the arrival notification mail, the process is terminated. If a person who makes a registration and does not receive the arrival notification mail is left, the flow returns to step S41, in which the transmission process is executed, after a predetermined time is measured in steps S44 and S45. The time measured in steps S44 and S45 follows the "distribution interval" set in the mail condition DB 22.

As described above, the server computer 1 transmits the arrival notification mail to a predetermined number of persons who make a registration at predetermined time intervals in their registration order.

Figure 12:
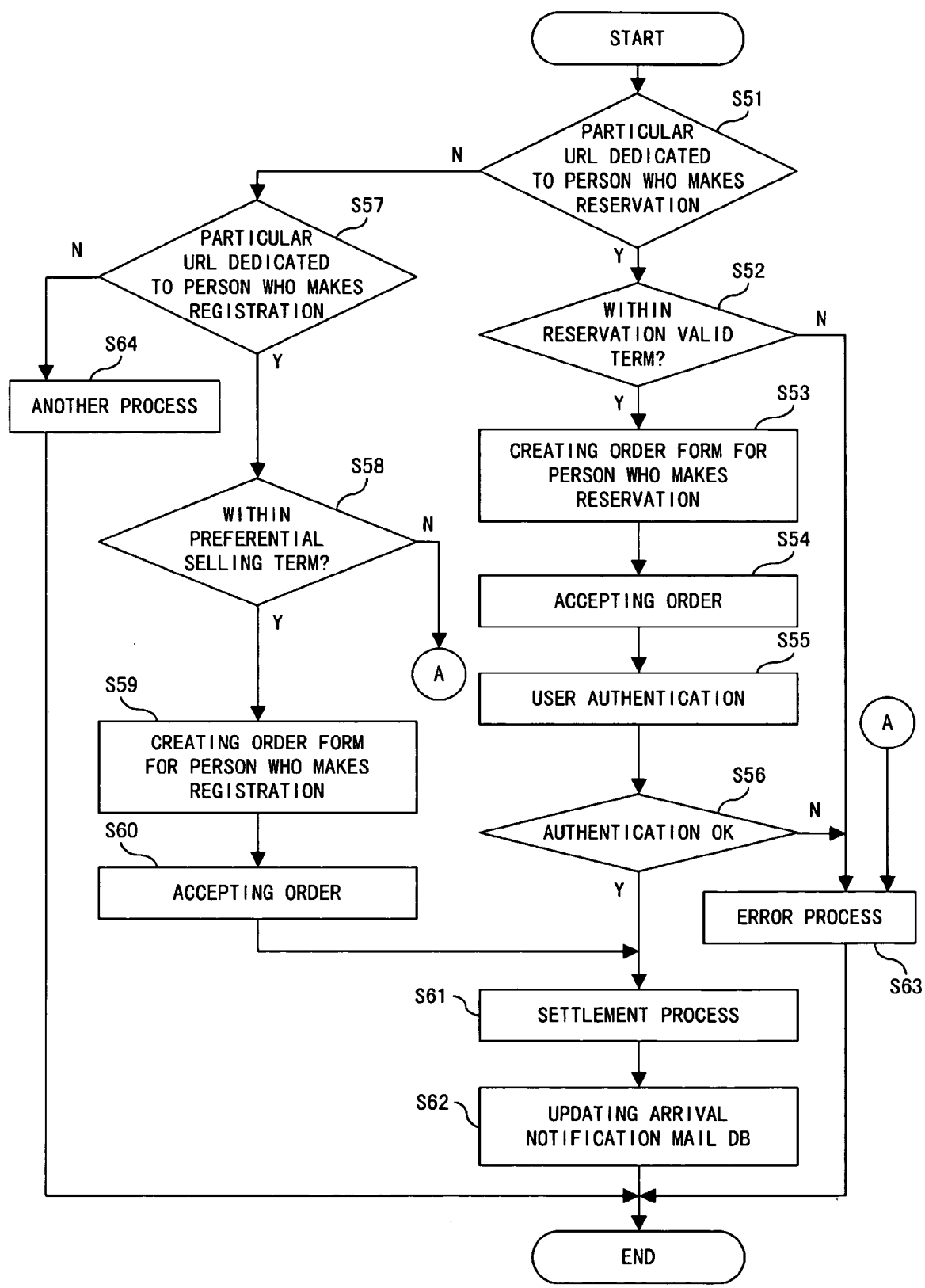
FIG. 12 is a flowchart showing the operations of the server computer accessed by using a particular URL.

FIG. 12 is a flowchart showing the operations of the server computer 1 accessed by using the particular URL. This process corresponds to step S11 of FIG. 8.

In steps S51 and S57, it is examined whether or not an access from a user is an access made by using the particular URL dedicated to a person who makes a reservation, or an access made by using the particular URL dedicated to a person who makes a registration. If the access from the user is the access made by using the particular URL dedicated to a person who makes a reservation, it is examined in step S52 whether or not the reservation valid time expires. Here, the reservation valid time is set in the mail condition DB 22, and measured from a time point when the arrival notification mail is transmitted to a person who makes a reservation.

Figure 13:
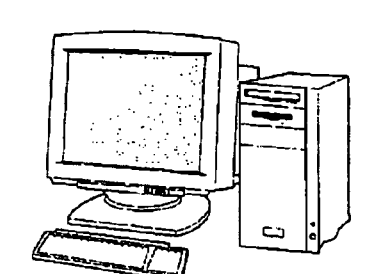
FIG. 13 exemplifies an order form for a person who makes a reservation.

If the reservation valid term does not expire, an order form for the person who makes the reservation is created. The order form for the person who makes the reservation includes a box for making the user input a reservation number, etc., and a box for inputting a purchase quantity, to which the reserved quantity is written beforehand, as shown in FIG. 13. Then, in step S54, the created order form for the person who makes the reservation is transmitted to the corresponding user terminal 2, and an order from the user is accepted. When the user, who receives the order form for the person who makes the reservation, actually purchases the corresponding commodity, he or she clicks the purchase instruction button, and inputs the previously notified reservation number, etc.

In steps S55 and S56, a user authentication process is executed. In the user authentication process, it is checked whether or not the reservation number input by the user and the reservation number previously assigned to the user match. If the user is an authorized person who makes a reservation, a settlement process is executed in step S61. Then, in step S62, the arrival notification mail DB 21 is updated. In this case, "purchased" is written as the "purchase flag" of the corresponding record.

Or, if the access from the user is the access made by using the particular URL dedicated to a person who makes a registration, it is examined whether or not the preferential selling term expires in step S58. The preferential selling term is set in the mail condition DB 22, and measured from a time point when the arrival notification mail is transmitted to a person who makes a registration.

If the preferential selling term does not expire, an order form for the person who makes the registration is created in step S59. The order form for a person who makes a registration is fundamentally the same as the above described order form for a person who makes a reservation. However, a box for inputting a reservation number, etc. is not provided, and no data is written to a box for inputting a purchase quantity. Then, in step S60, the created order form for the person who makes the registration is transmitted to the corresponding user terminal 2, and an order from the user is accepted. If the order from the user (the person who makes the registration) is received, steps S61 and S62 are executed in a similar manner as in the case where the order from the person who makes the reservation is received.

If the reservation valid term or the preferential selling term expires, or if the user authentication is unsuccessfully made, a corresponding error process is executed in step S63. Additionally, if an access made without using the general URL, the particular URL dedicated to a person who makes a reservation, or the particular URL dedicated to a person who makes a registration is detected, a process corresponding to the access is executed in step S64.

In the term (reservation valid term) during which the commodity is sold by using the particular URL dedicated to a person who makes a reservation, and in the term (preferential selling term) during which the commodity is sold by using the particular URL dedicated to a person who makes a registration, the commodity is not sold to a general user. Namely, if a general user visits the shopping site by using the general URL, a message indicating that the commodity is out of stock is displayed on the corresponding user terminal 2 in these terms.

Figure 14:
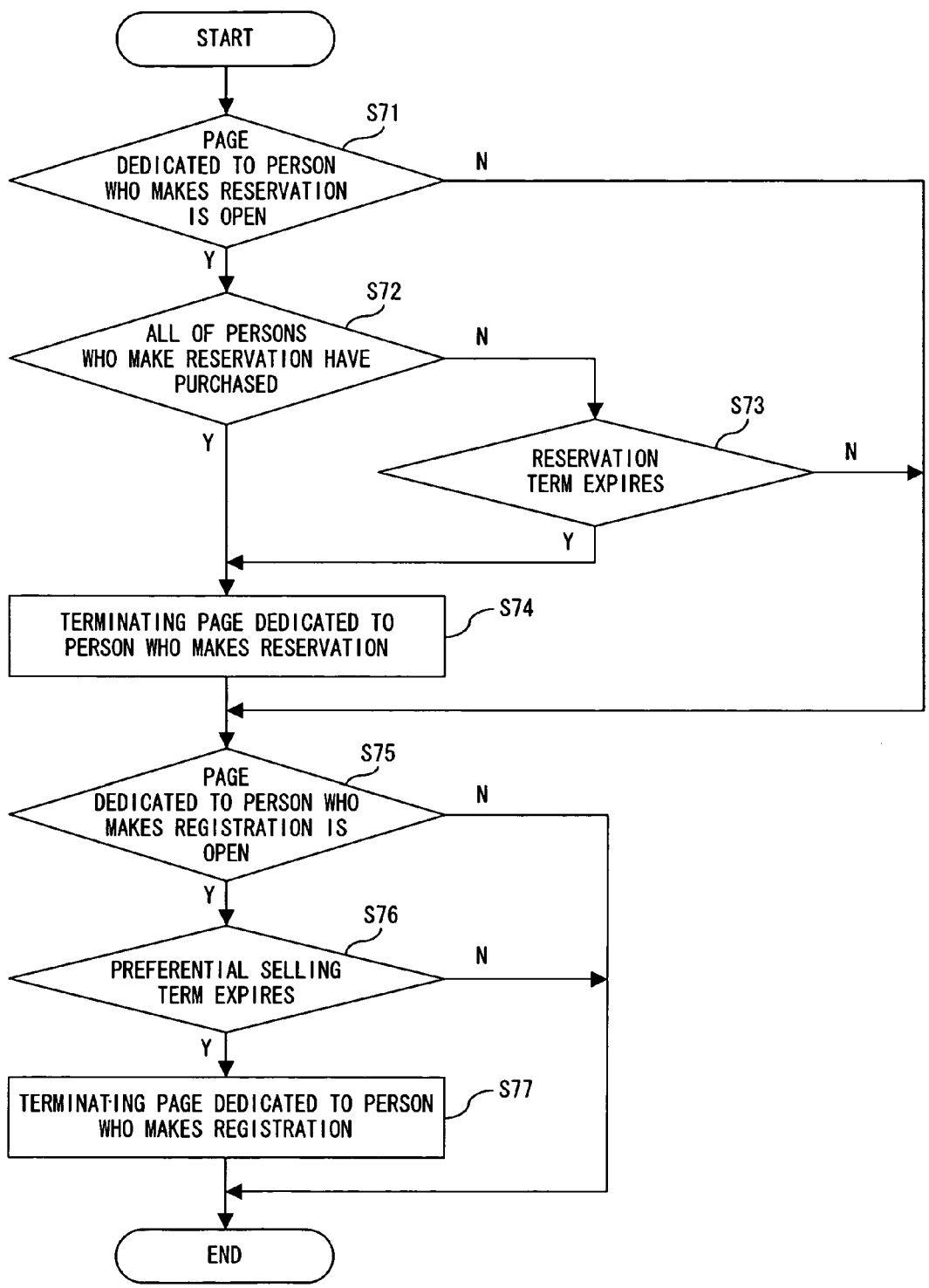
FIG. 14 is a flowchart showing a process in which the sever computer terminates a particular page.

FIG. 14 is a flowchart showing the process in which the server computer 1 terminates the dedicated pages. This process corresponds to step S29 of FIG. 9.

In step S71, it is examined whether or not the page dedicated to a person who makes a reservation is open. If the page is open, it is further examined in step S72 whether or not all of persons who make a reservation have purchased the commodity. This process is implemented in such a way that the "reservation" is set as the "application type", and a record in which "not yet purchased" is set as the "purchase flag" is searched in the arrival notification mail DB 21. In step S73, it is examined whether or not the reservation valid term expires. This process is implemented in such a way that a time elapsed from the time point when the arrival notification mail is transmitted to a person who makes a reservation exceeds the reservation valid term set in the mail condition DB 22.

If all of the persons who make a reservation have purchased the commodity, or if the reservation valid term expires, the page dedicated to a person who makes a reservation is terminated in step S74. As a result, an access using the particular URL dedicated to a person who makes a reservation is denied thereafter.

In step S75, it is examined whether or not the page dedicated to a person who makes a registration is open. If the page dedicated to a person who makes a registration is open, it is examined in step S76 whether or not the preferential selling period expires. This process is implemented in such a way that whether or not a time elapsed from the time point when the arrival notification mail is transmitted to a person who makes a registration exceeds the preferential selling term set in the mail condition DB 22 is examined. If the preferential selling term expires, the page dedicated to a person who makes a registration is terminated in step S77. As a result, an access using the particular URL dedicated to a person who makes a registration is denied thereafter.

As described above, the server computer 1 preferentially sells a commodity to a user who applied for the arrival notification mail when the commodity that was not available temporarily becomes available. Additionally, the server computer 1 makes an inquiry about the request level of the purchase of the commodity, when each user applies for the arrival notification mail. Then, the server computer 1 transmits the arrival notification mail to users whose request levels are high in descending order of request level, and accepts an order from the user whose request level is high.

In the above described embodiment, the server computer 1 offers the two request levels (the purchase reservation and the notification only) to a user. However, three or more request levels may be offered. An embodiment in the case where five request levels are offered is described below.

level 1: purchase reservation (deposit=¥5,000)
level 2: purchase reservation (deposit=¥1,000)
level 3: purchase reservation (no deposit)
level 4: notification only (with expiration date (for example, notification is made only when a commodity arrives within one week))
level 5: notification only (without expiration date)

In this case, the server computer 1 displays a screen for selecting a request level on the user terminal 2. When a user selects a desired request level by using the user terminal 2, the server computer 1 detects the selected request level.

FIG. 15 is a general-purpose flowchart showing the process in which the server computer 1 transmits the arrival notification mail. Here, assume a case where only N identical commodities that were out of stock have arrived. Also assume that request levels 1 to N are offered, and "L(i)" indicates the number of users with the request level i. Further assume that a quantity reserved by each user is one, for ease of explanation.

In step S81, "N" is set as an "in-stock quantity Z". In step S82, "1" is set as the initial value of the request level i. In step S83, a comparison is made between the in-stock quantity Z and the number of users L(i) with the request level i. If $Z \geq L(i)$, the arrival notification mail is transmitted to all of the users with the request level i in step S84.

In step S85, it is examined whether or not a user whose request level is lower than the request level i exists. If the user whose request level is lower than the request level i exists, "i" is incremented in step S86. After the in-stock quantity Z is updated in step S87, the flow goes back to step S83, then a similar process is executed for the next request level.

If the number of users L(i) with the request level i is larger than the in-stock quantity Z, Z users are selected from among the users with the request level i in their registration order. Then, in step S89, the arrival notification mail is respectively transmitted to the selected users.

As described above, the server computer 1 transmits the arrival notification mail to users whose request levels are high in descending order of request level, when an out-of-stock commodity becomes available. At this time, the number of mails transmitted (the number of users who receive the arrival notification mail) at one time is suppressed, whereby the processing load imposed on the server computer, and the traffic of the network can be prevented from increasing.

Note that the server computer 1 may transmit a questionnaire to a user when making an inquiry to the user about whether or not the user desires the arrival notification mail. Here, the questionnaire is implemented by displaying a screen for making a user input additional information on the user terminal 2. Although the additional information input by a user is not particularly limited, for example, a desired delivery date, a scheduled purchase quantity, or the like is assumed. In this case, the commodity seller can obtain data referenced when determining the quantity of a commodity, which is to be secured, by collecting and analyzing replies to the questionnaire from users.

In the above described embodiment, users whose request levels are high can receive the arrival notification mail in descending order of request level. However, another bonus or privilege may be offered to a user whose request level is high. For example, a selling price for the user whose request level is high may be discounted.

Figure 16:
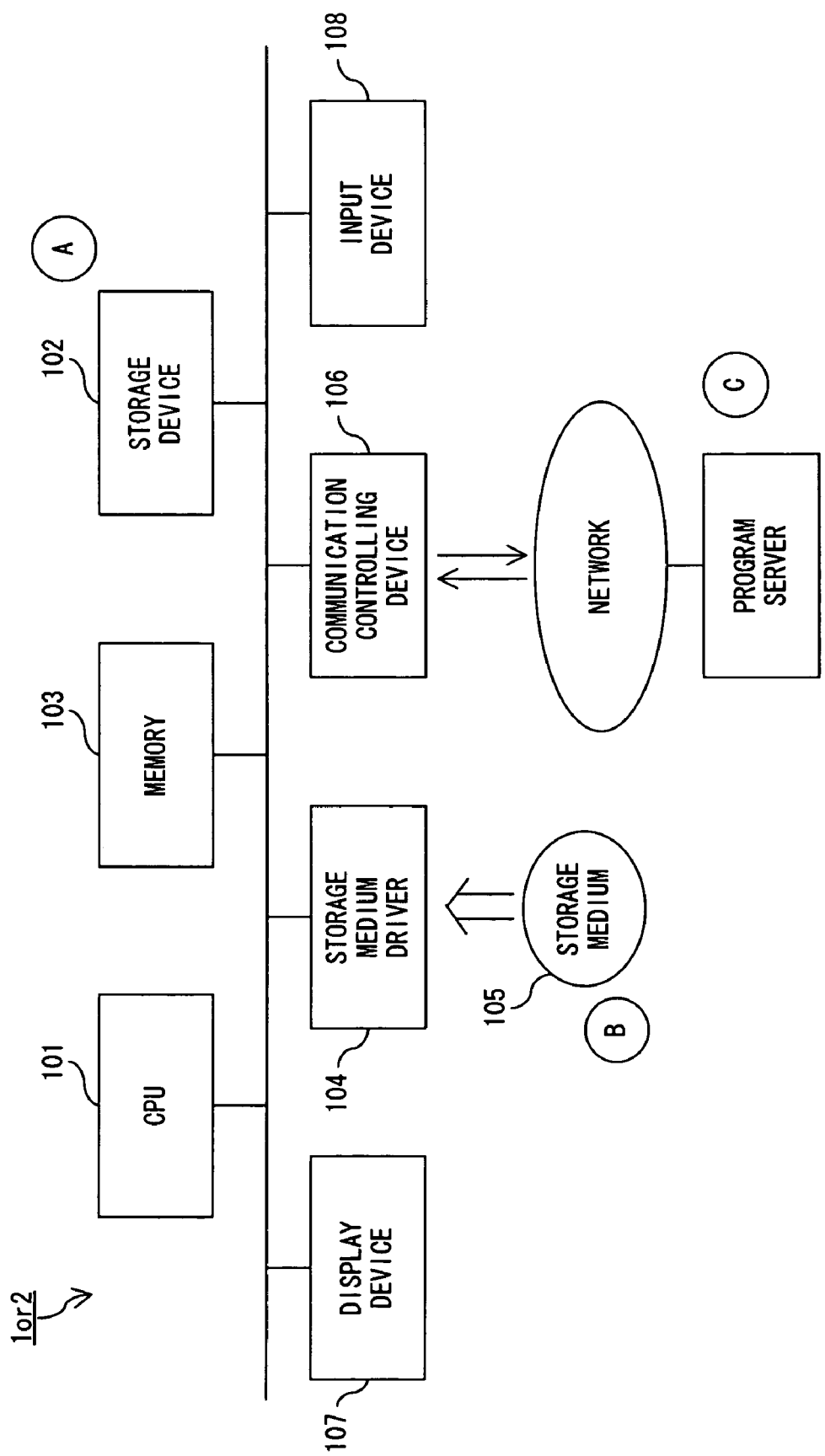
FIG. 16 shows the hardware configuration of the server computer and the user terminal.

FIG. 16 shows the hardware configuration of the server computer 1 and the user terminal 2.

A CPU 101 loads a predetermined program into a memory 103, and executes the program. Here, the server computer 1 executes the program that describes the procedures of the above described flowcharts. In the meantime, the user terminal 2 executes, for example, a browser program for browsing a Web page, a mailer program for transmitting/receiving mail, and the like.

A storage device 102 is, for example, a hard disk, and stores the above described program. A memory 103 is, for example, a semiconductor memory, and used as a working area of the CPU 101.

A storage medium driver 104 accesses a portable storage medium 105 in accordance with an instruction of the CPU 101. Examples of the portable storage medium 105 include a semiconductor device (a PC card, a memory stick, etc.), a medium (a flexible disk, a magnetic tape, etc.) to/from which data is input/output with a magnetic action, and a medium (an optical disk, etc.) to/from which data is input/output with an optical action.

A communication controlling device 106 provides an interface for transmitting a signal to a network, and for receiving a signal from the network. A display device 107 displays various types of data in accordance with an instruction of the CPU 101. An input device 108 notifies the CPU 101 of a user instruction. Note that the server computer 1 may not always comprise the display device 107. Additionally, the user terminal 2 may not always comprise the storage medium driver 104.

A software program according to the present invention is offered, for example, by an arbitrary one of the following methods.

method A: The software program is preinstalled on the server computer 1 and offered. In this case, the program is written to the storage device 102 prior to the shipment of the server computer 1.

method B: The software program is stored onto the portable storage medium and offered. In this case, the program stored onto the portable storage medium 105 is fundamentally installed in the storage device 102 via the storage medium driver 104.

method C: The software program is offered from a program server device via a network. In this case, the server computer 1 obtains the program stored in the program server device by downloading the program.

What is claimed is:

1. A method for notifying a user of information about a commodity from a server computer accepting a request in a system offering the commodity at the request of the user, comprising:

causing the server computer to make an inquiry to a user about a request level of purchase of a commodity if the commodity requested by the user cannot be offered, the request level indicating at least a reservation request for reservation of the commodity if the commodity becomes available or a notification request for notification if the commodity becomes available;

causing the server computer to receive request level information which indicates the request level from the user;

causing the server computer to transmit, to a user terminal of the user, commodity offering information about offering of the commodity based on the request level information received from the user, when the commodity which could not be offered becomes available, the commodity offering information being transmitted to a first user who issued the reservation request prior to a second user who issued the notification request; and causing the server computer to transmit corresponding commodity offering information to a number of users whose reguest levels are high, in descending order of request level, if the reguest level information is received from a plurality of users where the number of users receiving the commodity offering information is determined based on a quantity of the commodity that can be offered.

2. The method according to claim 1, further comprising causing the server computer to respectively create corresponding commodity offering information for each request level.

3. The method according to claim 1, further comprising causing the server computer to transmit commodity offering information to a predetermined number of users at predetermined time intervals in order.

4. A method for notifying a user of information about a commodity from a server computer accepting a request in a system offering the commodity at the request of the user, comprising:

causing the server computer to make an inquiry to a user about a request level of a purchase of a commodity and about an address of a user terminal of the user; if the commodity requested by the user cannot be offered;

causing the server computer to receive request level information which indicates the request level and the address from the user;

causing the server computer to store the received request level information and address in a database with a correspondence between them;

causing the server computer to retrieve from the database an address, to which commodity offering information about offering of the commodity is to be preferentially transmitted, based on the request level information when the commodity which could not be offered becomes available; and causing the server computer to transmit corresponding commodity offering information to the retrieved address of each of a number of users in descending order of the reguest level information, if the reguest level information is received from a plurality of user, where the number of users receiving the commodity offering information is determined based on a guantity of the commodity that can be offered.

5. The method according to claim 4, further comprising:

causing the server computer to divide addresses stored in the database into a plurality of groups based on the request level information; and wherein said causing the server computer to transmit corresponding commodity offering information is performed to each of the addresses at different times per group for a number of the groups in descending order of request level, when a quantity of the commodity which could not be offered becomes available, where the number of the groups receiving the commodity offering information is determined based on the quantity of the commodity that has become available.

6. A server device which sells a commodity requested by a user, comprising:

an inquiry unit which makes an inquiry to users about a request level of purchase of a commodity, if the commodity requested by the users cannot be offered;

a receiver which receives request level information to indicate the request level from the users, the request level information indicating at least a reservation request for reservation of the commodity if the commodity becomes available or a notification request for notification if the commodity becomes available; and a transmitter which transmits commodity offering information about offering of the commodity to a user terminal of a number of the users based on the request level information received from the users, when the commodity which could not be offered becomes available, so that a at least one first user who issued the reservation request receives the commodity offering information prior to at least one second user who issued the notification request and the number of the users receiving the commodity offering information is determined based on a guantity of the commodity that has become available.

7. A server device which sells a commodity requested by a user, comprising:

an inquiry unit which makes an inquiry to a user about a request level of purchase of a commodity and about an address of a user terminal of the user, if the commodity requested by the user cannot be offered;

a receiver which receives request level information to indicate the request level and the address from the user;

a storage unit which stores the received request level information and address with a correspondence between them;

a retrieving unit which retrieves from said storage unit an address, to which commodity offering information about offering of the commodity is to be preferentially transmitted, based on the request level information when the commodity which could not be offered becomes available; and a transmitter which transmits corresponding commodity offering information to the retrieved address of each of a number of users in descending order of the request level information, if the request level information is received from a plurality of users, where the number of users receiving the commodity offering information is determined based on a quantity of the commodity that can be offered.

8. A storage medium which stores a program for causing, so as to notify a user of information about a commodity in a commodity selling system, a computer to function as:

an inquiry unit which makes an inquiry to users about a request level of purchase of a commodity, if the commodity requested by the users cannot be offered, the request level indicating at least a reservation request for reservation of the commodity if the commodity becomes available or a notification request for notification if the commodity becomes available;

a receiver which receives request level information to indicate the request level from the users; and a transmitter which transmits commodity offering information about offering of the commodity to a user terminal of a number of the users based on the request level information received from the users, when the commodity which could not be offered becomes available, so that the commodity offering information is transmitted to at least one first user who issued the reservation request prior to at least one second user who issued the notification request and the number of the users receiving the commodity offering information is determined based on a guantity of the commodity that has become available.

9. A storage medium which stores a program for causing, so as to notify a user of information about a commodity in a commodity selling system, a computer to function as:

an inquiry unit which makes an inquiry to a user about a request level of purchase of a commodity and about an address of a user terminal of the user, if the commodity requested by the user cannot be offered;

a receiver which receives request level information to indicate the request level and the address from the user;

a storage unit which stores the received request level information and address with a correspondence between them;

a retrieving unit which retrieves from said storage unit an address, to which commodity offering information about offering of the commodity is to be preferentially transmitted, based on the request level information when the commodity which could not be offered becomes available; and a transmitter which transmits corresponding commodity offering information to the retrieved address of each of a number of users in descending order of the reguest level information, if the reguest level information is received from a plurality of users, where the number of users receiving the commodity offering information is determined based on a guantity of the commodity that can be offered.

10. A server device which sells a commodity requested by a user, comprising: inquiry means for making an inquiry to users about a request level of purchase of a commodity, if the commodity requested by the users cannot be offered;

receiving means for receiving request level information which indicates the request level from the users, the request level information indicating at least a reservation request for reservation of the commodity if the commodity becomes available or a notification request for notification if the commodity becomes available; and transmitting means for transmitting commodity offering information about offering of the commodity to a user terminal of a number of the users based on the request level information received from the users, when the commodity which could not be offered becomes available, so that the commodity offering information is transmitted to at least one first user who issued the reservation request prior to at least one second user who issued the notification request and the number of the users receiving the commodity offering information is determined based on a guantity of the commodity that has become available.

* * * * *

UNITED STATES PATENT AND TRADEMARK OFFICE
CERTIFICATE OF CORRECTION

| | |
|---|---|
| PATENT NO. | : 7,366,689 B2 |
| APPLICATION NO. | : 10/836234 |
| DATED | : April 29, 2008 |
| INVENTOR(S) | : Tetsuya Matsunaga |

It is certified that error appears in the above-identified patent and that said Letters Patent is hereby corrected as shown below:

Title Page, Column 2 (Foreign Patent Documents), Line 4, below "JP   11-213077   8/1999" delete "JP   2000-99585   2/2000".

Title Page, Column 2 (Other Publications), Line 4-6, below "magazine, No. 73, published by Impress Co., Ltd., 2001, pp. 291-299." delete "Hirokazu Tsubaki, "Seriously Investigating the Real Power: EC Benchmark 4th Catalog Mail-Order Selling", INTERNET magazine, No. 73, published by Impress Co., Ltd., 2001, pp. 291-299.".

Column 16, Line 3, change "reguest" to --request--.

Column 16, Line 4, change "reguest" to --request--.

Column 16, Line 22, after "level of" delete "a".

Column 16, Line 23, change "user;" to --user,--.

Column 16, Line 40, change "reguest" to --request--. (First Occurrence)

Column 16, Line 40, change "reguest" to --request--. (Second Occurrence)

Column 16, Line 43, change "guantity" to --quantity--.

Column 17, Line 8, after "so that" delete "a".

Column 17, Line 13, change "guantity" to --quantity--.

Column 18, Line 5, change "guantity" to --quantity--.

Column 18, Line 27, change "reguest" to --request--.

Column 18, Line 28, change "reguest" to --request--.

UNITED STATES PATENT AND TRADEMARK OFFICE
CERTIFICATE OF CORRECTION

| | |
|---|---|
| PATENT NO. | : 7,366,689 B2 |
| APPLICATION NO. | : 10/836234 |
| DATED | : April 29, 2008 |
| INVENTOR(S) | : Tetsuya Matsunaga |

It is certified that error appears in the above-identified patent and that said Letters Patent is hereby corrected as shown below:

Column 18, Line 31, change "guantity" to --quantity--.

Column 18, Line 54, change "guantity" to --quantity--.

Signed and Sealed this

Twelfth Day of August, 2008

JON W. DUDAS
*Director of the United States Patent and Trademark Office*